(12) United States Patent
Reardon et al.

(10) Patent No.: US 11,821,996 B1
(45) Date of Patent: Nov. 21, 2023

(54) OUTDOOR ENTITY AND WEAPON TRACKING AND ORIENTATION

(71) Applicant: Lockheed Martin Corporation, Bethesda, MD (US)

(72) Inventors: Peter F. Reardon, Orlando, FL (US); Timothy J. O'Malley, Chuluota, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 478 days.

(21) Appl. No.: 17/034,817

(22) Filed: Sep. 28, 2020

Related U.S. Application Data

(60) Provisional application No. 62/934,239, filed on Nov. 12, 2019.

(51) Int. Cl.
*G01S 19/48* (2010.01)
*G01S 19/51* (2010.01)
(Continued)

(52) U.S. Cl.
CPC .............. *G01S 19/48* (2013.01); *G01S 19/51* (2013.01); *F41G 3/26* (2013.01); *G01S 7/003* (2013.01);
(Continued)

(58) Field of Classification Search
CPC .......... G01S 19/48; G01S 19/18; G01S 19/43; G01S 19/51; G01S 19/40; G01S 7/003
(Continued)

(56) References Cited

U.S. PATENT DOCUMENTS

| 4,619,616 A | 10/1986 | Clarke |
| 5,675,112 A | 10/1997 | Giry et al. |

(Continued)

FOREIGN PATENT DOCUMENTS

| WO | WO-2020109515 A1 * | 6/2020 | ............... F41G 1/32 |
| WO | WO-2020167530 A1 * | 8/2020 | ............... F41G 1/38 |

OTHER PUBLICATIONS

Cady, "Using the National Training Center Instrumentation System to Aid Simulation-Based Acquisition", Pardee Rand Graduate School, Rand Corporation, Santa Monica, California, 2018, downloaded on Sep. 28, 2020 from https://www.rand.org/content/dam/rand/pubs/rgs_dissertations/RGSD400/RGSD406/RAND_RGSD406.pdf, pp. 1-168 (184 total pages).

(Continued)

*Primary Examiner* — Chuong P Nguyen
(74) *Attorney, Agent, or Firm* — Foley & Lardner LLP

(57) ABSTRACT

Systems and methods for tracking entities and objects in an environment can include an entity-mounted instrumentation (EMI) and an object-mounted instrumentation (OMI). The OMI can include a first IMU array to detect the object orientation, and a TOF pulse transmitter to transmit a TOF pulse. The EMI can include a second IMU array to detect the entity orientation, a GPS receiver, and an array of TOF sensors to receive various versions of the TOF pulse. The EMI can determine a location and orientation of the entity using GPS data and orientation data generated by the second IMU array. The EMI can determine a relative location of the object using the various versions of the TOF pulse, and can determine a location of the object using the relative location of the object and the location of the entity. The EMI can determine the object orientation using data provided by the first IMU array.

20 Claims, 6 Drawing Sheets

(51) Int. Cl.
   *G01S 19/43* (2010.01)
   *G01S 7/00* (2006.01)
   *G01S 19/18* (2010.01)
   *F41G 3/26* (2006.01)
   *G01S 19/40* (2010.01)

(52) U.S. Cl.
   CPC ............... *G01S 19/18* (2013.01); *G01S 19/40* (2013.01); *G01S 19/43* (2013.01)

(58) Field of Classification Search
   USPC ............ 342/357.23, 357.31, 357.34, 357.26, 342/357.56
   See application file for complete search history.

(56) References Cited

U.S. PATENT DOCUMENTS

| | | |
|---|---|---|
| 7,171,776 B2 | 2/2007 | Staley, III |
| 7,301,648 B2* | 11/2007 | Foxlin .................. G02B 27/017 356/620 |
| 8,022,986 B2 | 9/2011 | Jekel |
| 8,459,552 B2 | 6/2013 | Arbouw |
| 8,678,282 B1 | 3/2014 | Black et al. |
| 9,052,161 B2* | 6/2015 | Page ...................... G09B 19/00 |
| 9,250,035 B2 | 2/2016 | Sullivan et al. |
| 2009/0002677 A1* | 1/2009 | Lindquist .................. F41G 3/02 702/152 |
| 2012/0021385 A1 | 1/2012 | Belenkii et al. |

OTHER PUBLICATIONS

Inertial Labs, "Weapons Orientation Modules (WOM)", Inertial Labs website, downloaded on Sep. 28, 2020 from https://inertiallabs.com/products/wos/, pp. 1-9.

RDECOM, "Future Soldier 2030 Initiative", US Army Natick Soldier RD&E Center, Feb. 2009, downloaded on Sep. 28, 2020 from https://www.wired.com/images_blogs/dangerroom/2009/05/dplus2009_11641-1.pdf, pp. 1-19.

Zhu et al., "AR-Weapon: Live Augmented Reality based First-Person Shooting System", 2015 IEEE Winter Conference on Applications of Computer Vision, SRI International, Princeton, NJ, downloaded on Sep. 28, 2020 from https://ieeexplore.ieee.org/abstract/document/7045942, pp. 618-625.

* cited by examiner

OUTDOOR ENTITY AND WEAPON TRACKING AND ORIENTATION

CROSS REFERENCE TO RELATED APPLICATIONS

This application claims the benefit of priority under 35 U.S.C. § 119 to U.S. Provisional Patent Application No. 62/934,239 filed on Nov. 12, 2019, and entitled "OUTDOOR ENTITY AND WEAPON TRACKING AND ORIENTATION," which is incorporated herein by reference in its entirety.

FIELD

This disclosure generally relates to tracking of position and orientation of entities and an objects carried by the entities in an environment, and more particularly, to accurate position and orientation tracking of weapon and entity in various environments.

BACKGROUND

The following description is provided to assist the understanding of the reader. None of the information provided or references cited is admitted to be prior art. Many armed forces around the world use the multiple integrated laser engagement system (MILES) for training purposes. A MILES-based training environment to simulate a battle makes use of blank cartridges and laser. Specifically, weapons are equipped with laser beam transmitters and soldiers in the training environment carry laser sensors scattered over their bodies. The laser beam transmitters can be configured to mimic the actual range of the weapons on which the laser beam transmitters are mounted. The laser sensors on a given soldier can detect when the soldier is illuminated by the laser beam transmitter mounted on the weapon of another soldier.

SUMMARY

According to at least one aspect, a system to track entities and objects in an environment, can include a first inertial measurement unit (IMU) array mounted on an object carried by an entity to detect an orientation of the object, and an ultrasonic transmitter mounted on the object to transmit an ultrasonic signal. The system can include a real-time kinematics (RTK) global positioning system (GPS) receiver mounted on the entity, and a second IMU array mounted on the entity to detect an orientation of the entity in the environment. The system can include an array of ultrasonic receivers mounted on the entity to receive a plurality of versions of the ultrasonic signal transmitted by the ultrasonic transmitter. The array of ultrasonic receivers can be synchronized with the ultrasonic transmitter mounted on the object. The system can include one or more processors. The one or more processors can determine a position and orientation of the entity in the environment using positioning data received from the RTK GPS receiver and first orientation data generated by the second IMU array. The one or more processors can determine a relative position of the object with respect to the entity using the plurality of versions of the ultrasonic signal received by the array of ultrasonic receivers. The one or more processors can determine a position and orientation of the object in the environment using the position of the entity, the relative position of the object with respect to the entity and second orientation data generated by the first IMU array.

In some implementations, the system can include a first microcontroller mounted on the object to transmit the second orientation data generated by the first IMU array, and a second microcontroller mounted on the entity to receive the second orientation data from the first microcontroller. The one or more processors can receive the second orientation data from the second microcontroller. In some implementations, the system can include a stationary base station arranged in the environment. The stationary base station can include a GPS receiver, and a transmitter to broadcast a differential location error correction factor representing a difference between an actual location of the stationary base station and positioning data of the stationary base station generated by the GPS receiver. The one or more processors can determine the position of the entity further using the differential location error correction factor.

In some implementations, the object can be a firing weapon and the one or more processors can be mounted on the entity. The one or more processors can receive, from a remote server, positioning and orientation data of one or more other entities, and determine trajectory and landing position of munition fired by the firing weapon relative to the one or more other entities. The entity may include a ground vehicle, a drone, an aircraft or a human. In some implementations, the entity can be a human, and the second IMU array and the array of ultrasonic receivers can be mounted on a helmet of the human. In some implementations, the entity can be a human, and the system can further include augmented reality (AR) glasses communicatively coupled to the one or more processors. The environment can be a physical training environment, a virtual training environment, a constructive training environment or a combination of physical, virtual and constructive environments.

In some implementations, the object can be a firing weapon, and the system can further include one or more remote servers communicatively coupled to the one or more processors. The one or more remote servers can receive position and orientation data of the entity and the firing weapon from the one or more processors. The one or more remote servers can receive position and orientation data of other entities in the environment and position and orientation data of corresponding firing weapons associated with the other entities, and determine a trajectory and landing position of munition fired by the firing weapon relative to the other entities in the environment. The one or more remote servers can further record position and orientation data of the entity and position and orientation data of the firing weapon over a time duration. The one or more remote servers can record position and orientation data of the other entities in the environment and position and orientation data of the corresponding firing weapons over the time duration. The one or more remote servers can record events, including trajectories and landing positions of munition fired, within the time duration. The one or more remote servers may further reconstruct a scene of the environment corresponding to one or more timestamps within the time duration. The one or more remote servers may further reconstruct the scene from a viewpoint of the entity.

At least one aspect is directed to a method to track entities and objects in an environment. The method can include a first inertial measurement unit (IMU) array mounted on an object carried by an entity detecting an orientation of the object, and an ultrasonic transmitter mounted on the object transmitting an ultrasonic signal. The method can include a real-time kinematics (RTK) global positioning system (GPS) receiver, mounted on the entity, generating positioning data indicative of a position of the entity, a second IMU array mounted on the entity detecting an orientation of the entity in the environment. The method can include an array of ultrasonic receivers, mounted on the entity receiving a plurality of versions of the ultrasonic signal transmitted by the ultrasonic transmitter. The array of ultrasonic receivers can be synchronized with the ultrasonic transmitter. The method can include determining a position and orientation of the entity in the environment using the positioning data generated by the RTK GPS receiver and first orientation data generated by the second IMU array. The method can include determining a relative position of the object with respect to the entity using the plurality of versions of the ultrasonic signal received by the array of ultrasonic receivers. The method can include determining a position and orientation of the object in the environment using the position of the entity, the relative position of the object with respect to the entity and second orientation data generated by the first IMU array.

In some implementations, the method can include a first microcontroller mounted on the object transmitting the second orientation data generated by the first IMU array to a second microcontroller mounted on the entity. In some implementations, the method can include a stationary base station arranged in the environment broadcasting a differential location error correction factor representing a difference between an actual location of the stationary base station and positioning data of the stationary base station generated by a GPS receiver of the stationary base station. Determining the position and orientation of the entity can include using the differential location error correction factor.

In some implementations, the object can be a firing weapon and the method can include receiving, from a remote server, positioning and orientation data of one or more other entities. The method can include the remote server determining a trajectory and landing position of munition fired by the firing weapon relative to the one or more other entities. The entity can includes a ground vehicle, a drone, an aircraft or a human. The entity can be a human, and the second IMU array and the array of ultrasonic receivers can be mounted on a helmet of the human.

In some implementations, the object can be a firing weapon and the method further include one or more remote servers receiving position and orientation data of the entity and position and orientation data of the firing weapon. The method can include the one or more remote servers receiving position and orientation data of other entities in the environment and position and orientation data of corresponding firing weapons, and determining a trajectory and landing position of munition fired by the firing weapon relative to the other entities in the environment. In some implementations, the method can include the one or more remote servers recording position and orientation data of the entity and position and orientation data of the firing weapon over a time duration, and recording position and orientation data of the other entities in the environment and position and orientation data of the corresponding firing weapons over the time duration. The method can include the one or more remote servers recording events including trajectories and landing positions of munition fired during the time duration, and reconstructing a scene of the environment corresponding to a time instance or time interval of the time duration.

At least one aspect is directed to a computer-readable medium can store computer code instructions. The computer code instructions, when executed by the one or more processors, can cause the one or more processors to obtain first orientation data generated by a first inertial measurement unit (IMU) array mounted on an object carried by an entity, and obtain second orientation data generated by a second IMU array mounted on the entity. The first orientation data can be indicative of an orientation of the object, and the second orientation data can be indicative of an orientation of the entity in the environment. The one or more processors can cause an ultrasonic transmitter mounted on the object to transmit an ultrasonic signal, and cause an array of ultrasonic receivers, mounted on the entity, to receive a plurality of versions of the ultrasonic signal transmitted by the ultrasonic transmitter. The array of ultrasonic receivers can be synchronized with the ultrasonic transmitter. The one or more processors can receive, from a real-time kinematics (RTK) global positioning system (GPS) receiver mounted on the entity, positioning data indicative of a position of the entity, and determine a position and orientation of the entity in the environment using the positioning data generated by the RTK GPS receiver and the second orientation data. The one or more processors can determine a relative position of the object with respect to the entity using the plurality of versions of the ultrasonic signal received by the array of ultrasonic receivers. The one or more processors can determine a position and orientation of the object in the environment using the position of the entity, the relative position of the object with respect to the entity and the first orientation data.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The details of one or more implementations are set forth in the accompanying drawings and the description below. Other features, aspects, and advantages will become apparent from the description, the drawings, and the claims, in which:

It will be recognized that some or all of the figures are schematic representations for purposes of illustration. The figures are provided for the purpose of illustrating embodiments with the explicit understanding that they will not be used to limit the scope or the meaning of the claims.

DETAILED DESCRIPTION

Laser-based training systems used by the military for tracking direct fire engagements between soldiers may suffer many drawbacks. First, laser beams diverge over relatively long distances making the estimation of place of landing position of potentially fired ammunition not sufficiently accurate. Also, laser beams do not account for bullet or projectile splash. That is the laser beam is occluded by an obstacle and stops at the first feature it hits, therefore, it cannot depict or illustrate bullet or projectile penetration and/or divergence when hitting penetrable obstacles. Furthermore, when using laser-beams one cannot account for weather conditions or other factors that usually affect the ballistic trajectory. Lasers cannot mimic the path of a bullet or projectile because a laser is line-of-sight from where the laser beam starts to an obstacle in the path of the laser beam. In addition, many training systems employ Location of Misses and Hits (LOMAH) bars (arrays of sensors) in the training field or environment to accurately detect fired ammunition trajectory. The Location of Misses and Hits (LOMAH) bars are expensive equipment.

This technical solutions provides systems and methods for tracing positions and orientations of an entity and an object or weapon carried by the entity include an entity-mounted instrumentation and an object mounted instrumentation. Given the cost, and sometimes the weight, of GPS receivers, a single RTK GPS receiver can be integrated in the entity-mounted instrumentation to detect the location of the entity. The entity-mounted instrumentation can determine the relative position or location of the object, with respect to the entity, using time-of-flight (TOF) technology. Both the entity-mounted instrumentation and an object mounted instrumentation can include IMUs to detect the orientation of the entity and the orientation of the object.

The systems and method described herein are relatively inexpensive, light and comfortable to wear. The systems and methods described herein can be used for individuals as well as other entities such as, ground vehicles, marine vessels or boats flying vehicles or objects and/or robots. The systems and methods described herein can be employed in real training environments, virtual training environments, constructive training environments or a combination thereof.

Figure 1A:
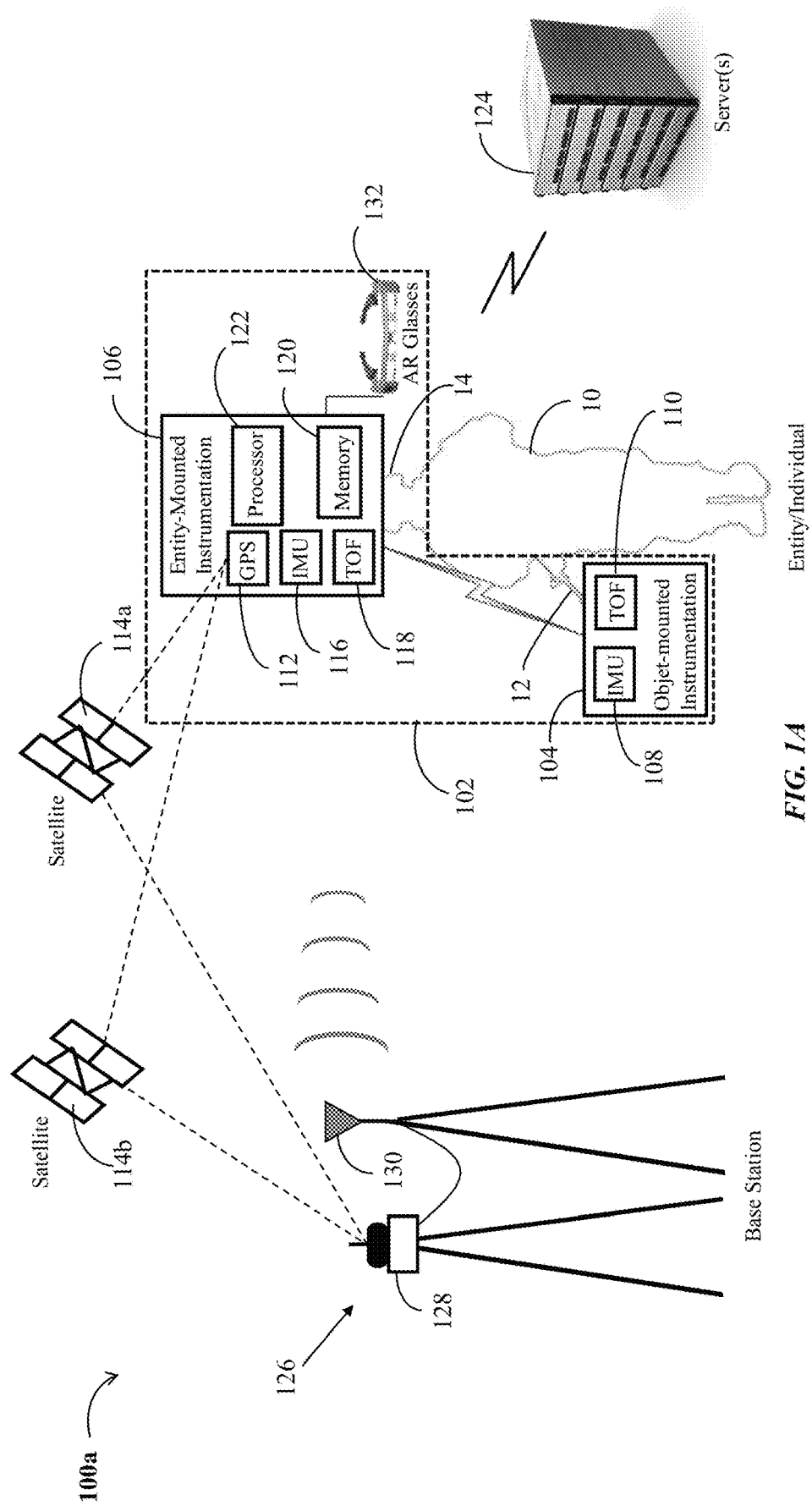
FIG. 1A shows a diagram illustrating a first environment employing instrumentation to track individuals and objects in the first environment, according to example embodiments.

Referring to FIG. 1A, a diagram illustrating an example environment 100a employing instrumentation to track individuals and objects is shown, according to example embodiments. In brief overview, the environment 100a can include one or more individuals 10, e.g., soldiers or trainees, each of whom carrying an object 12, such as a firearm or weapon. Each individual can carry a system 102 to track the position and orientation of both the individual 10 and the object 12. The system 102 can include an object-mounted instrumentation or subsystem (OMI) 104 and an entity-mounted instrumentation or subsystem (EMI) 106. The OMI 104 can be mounted on the firearm or weapon 12 carried by the individual 10, and may be referred to as weapon-mounted instrumentation or subsystem 104. The EMI 106 can be mounted on a helmet 14 of the individual 10, and may be referred to hereinafter as helmet-mounted instrumentation or subsystem 106. In some implementations, the EMI 106 can be mounted on another body part (e.g., chest or shoulders) of the individual, and may be referred to as individual-mounted instrumentation or subsystem 106.

The OMI 104 can include an inertial measurement unit (IMU) array 108 to detect an orientation of the object (or weapon) 12. The IMU array 108 can include one or more accelerometers to detect linear acceleration, one or more gyroscopes to detect rotational rate, and one or more magnetometers to determine orientation. The IMU array 108 can be a six-degree of freedom IMU array having a pair of an accelerometer and a gyroscope per axis for each of the three principal axes referred to as pitch, roll and yaw. In some implementations, the IMU array 108 can be a nine-degree of freedom IMU array having, for each of the three principal axes, a corresponding accelerometer, a corresponding gyroscope and a corresponding magnetometer. The OMI 104 can include an ultrasonic transmitter 110 (or more generally a time-of-flight (TOF) pulse transmitter) to transmit ultrasonic signals (or TOF pulses). The ultrasonic transmitter 110 can be configured to transmit ultrasonic signals on a regular basis or periodically. As discussed in further detail below, the ultrasonic signals transmitted by the ultrasonic transmitter 110 are for use to determine a location or position of the object 12 (or the OMI 104) relative to the helmet 14 or individual 10.

The EMI (or helmet-mounted instrumentation or subsystem) 106 can include a global positioning system (GPS) receiver 112 for determining the location or position of the individual 10 or helmet 14. The GPS receiver 112 can be, or can include, a real-time kinematics (RTK) GPS receiver. The GPS receiver 112 can receive GPS signals from a plurality of satellites, such as satellites 114a and 114b, and use the GPS signals to determine world-based location or position of the helmet 14 or the individual 10. The GPS receiver 112 can periodically or repeatedly receive GPS signals, and determine the real-time location of the helmet 14 or the individual as the individual 10 moves within the environment 100a. The satellites 114a and 114b are referred to hereinafter, individually or collectively, as satellite(s) 114.

The EMI 106 can include an IMU array 116 to detect an orientation of the helmet 14 or the individual 10 in the environment 100a. The IMU array 116 can be similar to the IMU array 108 of the OMI 104. For instance, the IMU array 116 can be a six-degree of freedom IMU array, and can include a corresponding pair of an accelerometer and a gyroscope per axis the three principal axes referred to as pitch, roll and yaw. In some implementations, the IMU array 116 can be a nine-degree of freedom IMU array, and can include for each axis of the three principal axes a corresponding accelerometer, a corresponding gyroscope and a corresponding magnetometer. The EMI 106 can include an array of ultrasonic receivers (or more generally, an array of TOF pulse receivers) 118 to receive a plurality of versions of the ultrasonic signal transmitted by the ultrasonic transmitter 110. The array of ultrasonic receivers 118 can be synchronized (in time) with the ultrasonic transmitter 110 of the OMI 104. For instance, the clock of the array of ultrasonic receivers 118 and the clock of the ultrasonic transmitter 110 can be synchronized with each other within few nano-seconds. The plurality of versions of the ultrasonic signal transmitted by the ultrasonic transmitter 110 can be associated with different relative time delays reflecting the difference in distance between the ultrasonic transmitter 110 and each of the ultrasonic receivers or sensors in the array of ultrasonic receivers 118.

The system 102 can include a memory 120 and one or more processors 122. The memory 120 and the one or more processors 122 can be arranged in the EMI 106, in one or more remote servers 124 that are communicatively coupled to the EMI 106 or both. For instance, each of the EMI 106 and the one or more remote servers 124 can include a corresponding memory 120 and one or more corresponding processors 122. The one or more remote servers 124 and the system 102 (or EMI 106) can communicate with each other wirelessly, e.g., via a long-range radio interface such as fourth-generation (4G) or fifth-generation (5G) communication.

The memory 120 can store computer code instructions executable by the one or more processors 122, intermediate data generated when executing the computer code instructions, generated local and orientation data of both the individual 10 (or helmet 14) and the object 12, other data generated by methods and processes described herein or a combination thereof. The memory 120 can include cache memory of the one or more processors 122, random access memory (RAM), read-only memory (ROM), a storage device or a combination thereof. The one or more processors 122 can include a microprocessor, a multi-core processor, a general purpose processor, a digital signal processing (DSP) processor, a field-programmable gate array (FPGA), an application-specific integrated circuit (ASIC), or a combination thereof.

The one or more processors 122 can obtain location or positioning data generated by the GPS receiver 112 and orientation data generated by the second IMU array 116. The one or more processors 122 can determine a position and orientation of the individual 10 (or helmet 14) in the environment 100a using the location or positioning data generated by the GPS receiver 112 and the orientation data generated by the second IMU array 116. For instance, the one or more processors 122 can combine the location or positioning data generated by the GPS receiver 112 and the orientation data generated by the second IMU array 116 to determine the location and orientation of the individual 10 (or the helmet 14) in the environment 100a. Determining the location of the individual 10 can include determining earth coordinates, e.g., latitude and longitude, of the individual 10. In determining the orientation of the helmet 14 (or the head of the individual 10) can include, the one or more processors can determine a vector pointing to the direction at which the individual 10 (or the individual head) is looking. The one or more processors 122 can project the location and/or orientation of the individual 10 (or the helmet 14) onto an electronic map of the environment 100a.

The one or more processors 122 can determine a relative position of the object (or weapon) 12 with respect to the individual 10 using the plurality of versions of the ultrasonic signal received by the array of ultrasonic receivers 118, or time delay information related to the plurality of versions of the ultrasonic signal. The plurality of versions of the ultrasonic signal received by the array of ultrasonic receivers 118 represent different delayed versions of the transmitted ultrasonic signal. The one or more processors 122 or the array of ultrasonic receivers 118 can use cross-correlation signals representing cross-correlations between the transmitted ultrasonic signal and each of the plurality of delayed versions of the ultrasonic signal received by the array of ultrasonic receivers 118. The one or more processors 122 or the array of ultrasonic receivers 118 can determine time delays associated with each of the delayed versions of the ultrasonic signal received by the array of ultrasonic receivers 118. Using the determined time delays and the speed of ultrasonic waves in the air, the one or more processors 122 or the array of ultrasonic receivers 118 can determine the distances between the ultrasonic transmitter 110 and each of the ultrasonic sensors of the array of ultrasonic receivers 118. The one or more processors 122 can determine the location of the object (or weapon) 12 relative to the individual 10 based on the determined distances.

Given a set of N (N≥4) receiving ultrasonic sensors of the array of ultrasonic receivers 118 and the ultrasonic transmitter 110, the one or more processors 122 can define the analytical solution for the location of the ultrasonic transmitter 110 as the intersection of N spheres. Each of the N spheres can be centered at a corresponding ultrasonic sensor of the N receiving ultrasonic sensors, and can have a radius equal to the determined distance between the corresponding ultrasonic sensor and the ultrasonic transmitter 110. The one or more processors 122 can determine the location of the ultrasonic transmitter 110 or the object 12 as the point of intersection of the N spheres. The one or more processors 122 can define N equations of the form:

$$(x-x_i)^2+(y-y_i)^2+(z-z_i)^2=d_i^2, \qquad (1)$$

where i=1, . . . , N, and the location of the $i^{th}$ receiving ultrasonic sensor is defined by the point $(x_i, y_i, z_i)$. The distance between the $i^{th}$ receiving ultrasonic sensor and the ultrasonic transmitter 110 is equal to d.

In a real world set up, the position of the receiving ultrasonic sensors and the transmission range of the ultrasonic transmitter 110 may not be known with total accuracy. In such non-ideal situation, the system 102 can provide the transmission range of the ultrasonic transmitter 110 within an accuracy margin (or error tolerance). Likewise, the location of the receiving ultrasonic sensors $(x_i, y_i, z_i)$ are subject to some error margins depending on, for example, the accuracy of the data provided by the GPS receiver 112, and/or the accuracy of measurement of distances of the receiving ultrasonic sensors from a reference point. All of these sources of error may distort the analytical resolution of equation (1). Specifically, the analytical solution may not be an individual point, but rather a volume defined by the intersection of the spheres due to such error. As such, the one or more processors 122 can determine the position of the ultrasonic transmitter 110 as a point inside the volume representing the intersection of the N spheres that satisfies:

$$d_i-\text{Error} \le d_i \le d_i+\text{Error}. \qquad (2)$$

Equation (2) applies for each of the N receiving ultrasonic sensors, and is based on the assumption that the error in the position (or coordinates) of each receiving ultrasonic sensor is negligible compared with the precision for the transmission range of the ultrasonic transmitter 110. The intent behind equation (2) is to minimize the error, making it as close as possible to the system inherent error, and to minimize the algorithm computation time so it is in the realm of "real time" simulation, with typical numbers around 30 to 60 Hz. That is, the algorithm can be executed 30 to 60 times per second.

Another factor to be considered in solving equations (1) and (2), is that the sensor's field of view (FOV) is limited. Specifically, in practice the one or more processors 122 do not need to check the intersection of N spheres, but rather the intersection of N sections of the spheres. The N sections are defined by the original N spheres and the FOV of each ultrasonic sensor. The one or more processors 122 can solve the problem defined by equation (1) and (2) using a Monte Carlo method (or algorithm) to find the point (x, y, z) representing the location of the ultrasonic transmitter 110 or the object 12 relative to a reference point of the individual 10 or the helmet 14.

In some implementations, the one or more processors 122, in applying the Monte Carlo algorithm, can generate random points for i=1 that satisfy:

$$d_1-\text{Error} \le d_1 \le d_1+\text{Error}. \qquad (3)$$

The one or more processors 122 can verify which of the generated points also satisfy the equations (1) and (2) for the remaining N-1 receiving ultrasonic sensors. Error can be defined as the system error (e.g., determined by hardware limitation on the system). The searching volume can be viewed as the maximum FOV of the system, which maximizes the searching time. In order to reduce the searching time, the Error can be bigger than the system error, allowing the one or more processors 122 to find the solution in a bigger volume faster, and reduce the searching time at the cost of reduced accuracy. However, such approach may be unviable for a high accuracy real time solution.

In some implementations, the one or more processors 122 can employ a Monte Carlo iterative approach that helps break the problem resolution into several phases. Each phase can yield a solution with an inherent error closer to the hardware resolution. Based on the approach previously described, the one or more processors 122 can apply a similar technique. However, instead of minimizing the error, the one or more processors 122 can starts with A*Error value, where Error is defined by the hardware resolution and A is a number bigger than 1. After finding a solution, the one or more processors 122 can search for a point with an error equal to B*Error, with 1<B<A, but narrowing the search to a smaller FOV centered on the first solution. This approach effectively reduces the searching volume and facilitates finding a faster solution. Proceeding iteratively in cascade, the error can be refined without exceeding the computational time goal. This approach achieves resolutions close to the hardware resolution and computational times that can be considered real-time or near real-time. Applying this Monte Carlo iterative approach several times, the one or more processors 122 can determine a solution for (x, y, z) in a volume dependent on the hardware resolution, and the geometry of the array of ultrasonic receivers 118 and the ultrasonic transmitter 110.

Figure 2:
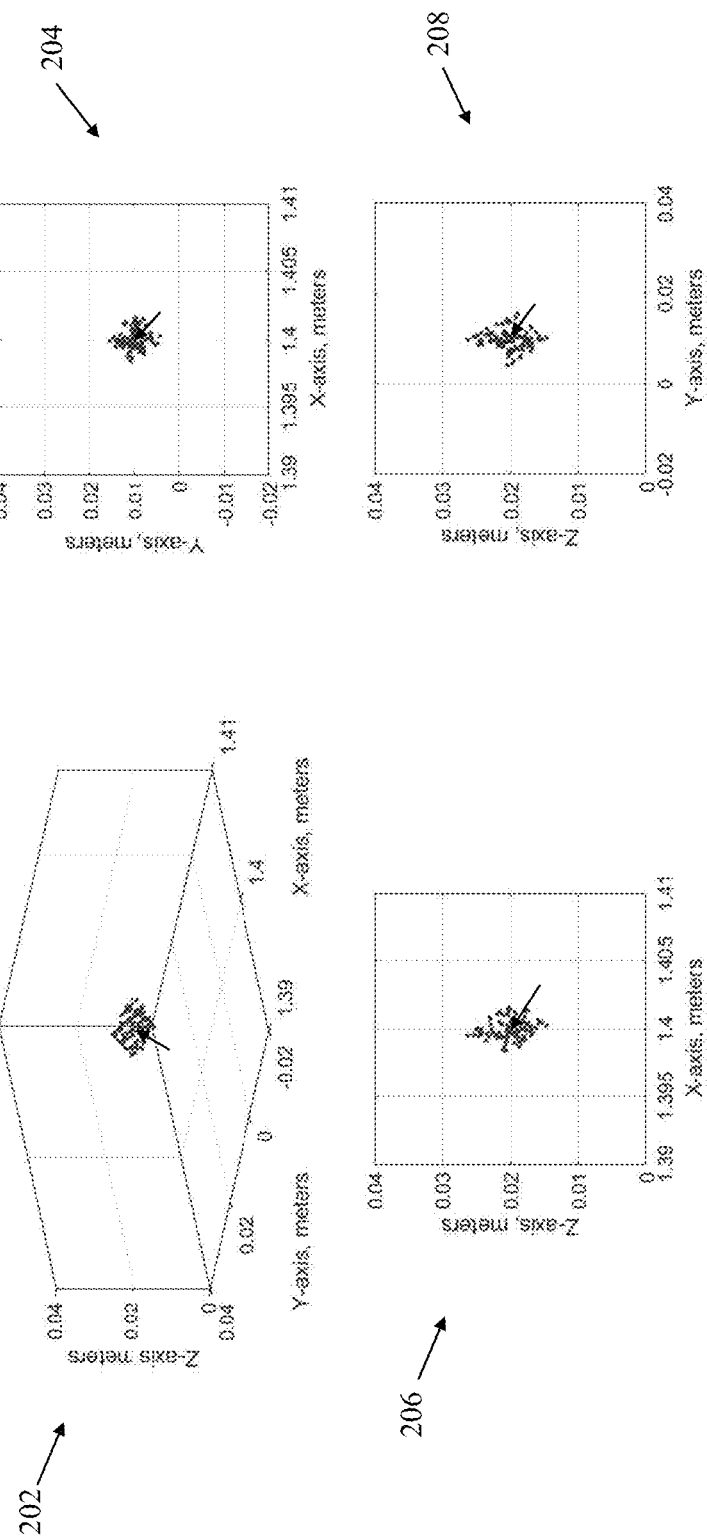
FIG. 2 shows different graphs of simulation results of a Monte Carlo iterative approach for 100 test cases of object localization relating to an entity carrying the object.

Referring to FIG. 2, different graphs 202, 204, 206 and 208 of simulation results of the Monte Carlo iterative approach for 100 test cases are shown. Graph 202 represents a three-dimensional (3-D) view of simulation results. Graphs 24, 206 and 208 represent views of the simulation results in the X-Y, X-Z and Y-Z planes. The dots in the various graphs show the determined locations of the ultrasonic transmitter 110 by applying the Monte Carlo iterative algorithm for the 100 test cases. The arrows in each of the graphs point the actual location of the ultrasonic transmitter 110. Comparing the actual location of the ultrasonic transmitter 110 to the corresponding locations determined by applying the Monte Carlo iterative algorithm, one can see that the error in each direction (or along each axis) is within few millimeters and less than 1 centimeter.

Referring back to FIG. 1A, the one or more processors 122 can determine a position and orientation of the object (or weapon) 12 in the environment 100a, using the position and orientation of the individual 10 (or helmet 14), the relative position of the object (or weapon) 12 with respect to the individual 10 (or helmet 14), and the orientation data generated by the IMU array 116. In determining the location or position of the object (or weapon) 12, the one or more processors 122 can use the location or position of the individual 10 provided by the GPS receiver 112 and the determined coordinates (x, y, z) of the ultrasonic transmitter 110 or the object 12 relative to a reference point of the individual. Specifically, the one or more processors 122 can transform the coordinates (x, y, z) into earth coordinates defined in terms of latitude, longitude and altitude. In some implementations, the one or more processors 122 can transform the earth coordinates of the individual 10 (or helmet 14) into new coordinates defined relative to a fixed reference point of the environment 100a and a corresponding coordinate system. The one or more processors 122 can then transform the coordinates (x, y, z) into corresponding coordinates in the coordinate system associated with the fixed reference point of the environment 100a.

With respect to determining the orientation of the object (or weapon) 12, the one or more processors 112 can use the orientation data generated by the second IMU array 116 indicative of the orientation of the individual 10 (or helmet 14), and the orientation data generated by the IMU array 108 indicative of the orientation of the object (or weapon) 12. The OMI 104 and the EMI 106 can be communicatively coupled, for example, via a short range serial radio communication interface. The OMI 104 can transmit the orientation data generated by the IMU array 108 to the EMI 106 via the short range serial radio communication interface, and the one or more processors 112 can obtain or access the received orientation data generated by the IMU array 108. The one or more processors 112 can determine an orientation of the object (or weapon) 12 in the environment 100a using the orientation data generated by the IMU array 108. The one or more processors 122 can project the locations and orientations of the individual 10 (or helmet 14) and the object (or weapon) 12 on an electronic map of the environment 100a.

In some implementations, the environment 100a can include a stationary base station 126. The stationary base station 126 can include a GPS receiver 128 and a radio transmitter 130 communicatively coupled to the GPS receiver 128. The GPS base station has a known very highly accurate fixed location that can be derived from surveying the base station before any training exercise in the environment 100a. The GPS receiver 128, or other component of the base station 126, can compare the position data of the base station 126 determined based on surveying with the position data generated by the GPS receiver 128 based on received satellite signals. The GPS receiver 128, or other component of the base station 126, can determine a differential location error correction factor that represents the difference between the true or actual location and the location determined based on received satellite signals. The GPS receiver 128, or other component of the base station 126, may also determine phase correction data. The transmitter 130 can periodically broadcast both sets of data to all the 112 GPS receivers. The 112 GPS receivers can apply the received error correction factors to their entity GPS data to determine a more accurate entity position/location.

While FIG. 1A shows a single individual 10 in the environment 100a, in general, the environment 100a can include a plurality of individuals 10 or entities carrying corresponding objects (or weapons) 12. Each individual 10 or entity can have a corresponding OMI 104 and a corresponding EMI 106. Each EMI 106 can transmit determined locations and orientations of the corresponding individual 10 and the corresponding object 12 to the one or more servers 124. Also, each EMI 106 can receive data from the one or more servers 124 indicative of locations and orientations of other entities or individuals 10 and/or respective objects (or weapons) 12. Furthermore, each EMI 106 can maintain, or receive from the one or more servers 124, data indicative of a map of the environment 100a and/or locations of structures or potential targets within the environment 100a.

For each individual or entity 10, the one or more processors 122 integrated in the corresponding EMI 106 can determine trajectories and/or landing positions of ammunition, e.g., bullets, shells, blanks, missiles or other projectiles, fired by the weapon 12 of the individual or entity 10. The one or more processors 122 can use the location and orientation of the weapon 12 and the location and orientation of other individuals or potential targets in the environment 100a to determine the ballistic trajectories and/or landing positions of the ammunition relative to the one or more other entities or targets. In determining the ballistic trajectories and/or landing positions of the fired ammunition, the one or more processors 122 can account for various factors, such as weather conditions (e.g., wind, air humidity, air temperature, air pressure, etc.), effect of obstacles on the path of the fired ammunition, detected vibration or shaking of the weapon 12 at the time the ammunition is fired, vertical orientation angle of the weapon 12 at the time the ammunition is fired or a combination thereof. The one or more processors 122 can employ a ballistic algorithm or model in determining the ballistic trajectories and/or landing positions of the fired ammunition. Accounting for the above mentioned factors allows the one or more processors 122 to more accurately determine whether the entity 10 shot or missed a target, for example, compared to laser-based approaches.

In some implementations, the one or more servers 124 can determine the ballistic trajectories and/or landing positions of ammunitions fired by various weapons 12 of various individuals or entities 10. The one or more servers 124 may include a ballistic server, for example, designated to determine the ballistic trajectories and/or landing positions of ammunitions fired by various weapons 12 in the environment 100a. The one or more servers 124 can receive location and orientation data for various entities or individuals 10 and corresponding weapons 12 from the respective EMIs 106, as well as data indicative of firing or shooting events. Data indicative of firing events can include timestamps indicative of the time instance at which each bullet or projectile is hot, the location and orientation of the weapon 12 that fired the bullet or projectile at the time instance of the shooting event or a combination of both. The one or more servers 124 can provide a more accurate determination of the ballistic trajectories and/or landing positions of the fired ammunitions compared to that provided by the EMIs 106 associated with each individual 10. For instance, the one or more servers 124 can account for movement of targets or targeted entities 10 in the environment 100a at the time ammunition is fired at them. Also, the one or more servers 124 can employ more accurate, but computationally more demanding, ballistic algorithms or models then those employed by the processors 122 integrated EMIs 106.

The one or more servers 124 can record the positions and orientations of the various entities 10 and corresponding weapons 12 in the environment 100a over time. The one or more servers 124 can associate each recording of positions and orientations of an entity 10 and corresponding object or weapon 12, at a given a time instance, with a timestamp indicative of the time instance. The one or more servers 124 can record various events, such as ammunition firing events over time. Recording the ammunition firing events can include the one or more servers 124 recording the trajectories and landing positions of fired ammunition over time as well as the timestamps indicative of the time instance at which each event occurred. The one or more servers 124 can link or associate, e.g., via data structures, each recorded event with one or more corresponding entities or individuals 10. For instance, the one or more servers 124 can associate or link each ammunition-firing event with the corresponding shooting entity, the corresponding target, other entities or targets within the vicinity of the ballistic trajectories and/or landing positions associated with the ammunition-firing event.

The one or more servers 124 can record the positions and orientations of the various entities 10 and corresponding weapons 12 as well as the various events in the environment 100a over time duration, for example, corresponding to a training session in the environment 100a. For instance, the one or more servers 124 can include a gaming server designated to record and mange content associated with the environment 100a and/or the entities 10 therein. The one or more servers 124 can reconstruct a scene using data recorded during the training session or the time duration. For instance, the one or more servers 124 can receive, e.g., via a user interface or an input device, timing information indicative of a time interval of the training session or the time duration. The one or more servers 124 can identify timestamps, associated with recorded events or positions and orientations, that fall within the time interval indicated by the input timing information, and use identified timestamps to retrieve recorded data associated with time interval. The one or more servers 124 can use the retrieved recorded data to reconstruct a scene of the environment 100a during the time interval.

In some implementations, the recorded data can include video data recorded by various cameras arranged within the environment 100a or mounted on the entities or individuals 10, and the one or more servers 124 can reconstruct the scene using the recorded video data. In some implementations, the one or more servers 124 can reconstruct the scene using non-video data. For instance, the one or more servers 124 can use data indicative of positions and orientations of various entities or individuals 10 and corresponding objects or weapons 12 to reconstruct an animation video sequence. The one or more servers 124 can employ avatars to represent various entities or individuals 10 in the animation video sequence. In other words, the one or more servers 124 can reconstruct an animation video sequence of the scene even when no cameras are used during the training session or time duration. In some implementations, the one or more servers 124 can include a graphics server configured to reconstruct animation scenes. In some implementations, the reconstructed scene can be of a different form or format, such as a sequence of still images or diagrams, a slide show or other format.

In some implementations, the one or more servers 124 can reconstruct the scene of the environment 100a from the viewpoint of a given entity or individual 10. For instance, the one or more servers 124 can receive input data indicative of the entity or individual 10, and determine the position and orientation over the entity or individual 10 over the time interval. The one or more servers 124 can determine a FOV of the entity or individual 10 over the time interval based on the determined position and orientation of the entity or individual 10 over the time interval. The one or more servers 124 can reconstruct the scene according to the determined FOV of the entity or individual 10 over the time interval. In some implementations, the one or more servers 124 can reconstruct a scene associated with a specific location within the environment, a specific view angle or a combination of both. In some implementations, the one or more servers 124 can reconstruct a scene based on virtual camera whose position and orientation over the time interval may be received as input, or automatically defined, by the one or more servers 124. The ability to reconstruct scenes from various locations, viewpoints or angles allows for thorough or deep analysis of various facts or scenarios of the training session or the performance of each entity or individual 10 during the training session.

In some implementations, the EMI 106 can include a pair of augmented reality (AR) glasses 132 worn by the individual 10. The pair of AR glasses 132 can be communicatively coupled to the one or more processors 122 and/or the one or more servers 124. The pair of AR glasses 132 can display content streamed by the one or more servers 124, e.g., via the one or more processors 122. The one or more servers 124 and/or the one or more processors 122 can treat the location and orientation of the pair of AR glasses 132 at any point in time as being identical to the location and orientation of the helmet 14 at that same point in time.

The environment 100a can include a real (or physical) training environment, where all entities 10 and/or environment structures are real. The environment 100a can include a live virtual training environment, for example, a real entity (e.g., individual or tank) is fighting against virtual entities, such as virtual individuals or tanks. The virtual environment can be defined by live content displayed via the pair of AR glasses 132 (or other display device) of the real entity. The environment 100a can include a constructive training environment. A constructive environment is an abstracted or aggregated level of training where battle command staff monitor or interact with the training environment but more from a "sending orders" and "receiving reports" perspective, at either tactical cells (aviation, mechanized infantry, field artillery, dismounted infantry, logistics, etc. . . . ) that enable them to train as they would fight at that aggregate level. In a constructive environment, the battle command staff or individuals may not necessarily know if they are dealing with a live or simulated environment. They just interact via their command level interfaces. In some implementations, the environment 100a can be a hybrid environment including a combination of real, virtual and constructive environments. For example, environment structures (e.g., buildings, terrain, trees, lakes, etc.) can be real. Also, one or more entities can be real. However, potential targets can be virtual. Specifically, AR glasses 132 or other display devices can project virtual targets on real terrain and/or structures. Furthermore, even if the environment 100a is real, as discussed above, the one or more servers 124 can generate a virtual reconstruction of the environment 100a or scenes thereof using avatars an animation items.

Figure 1B:
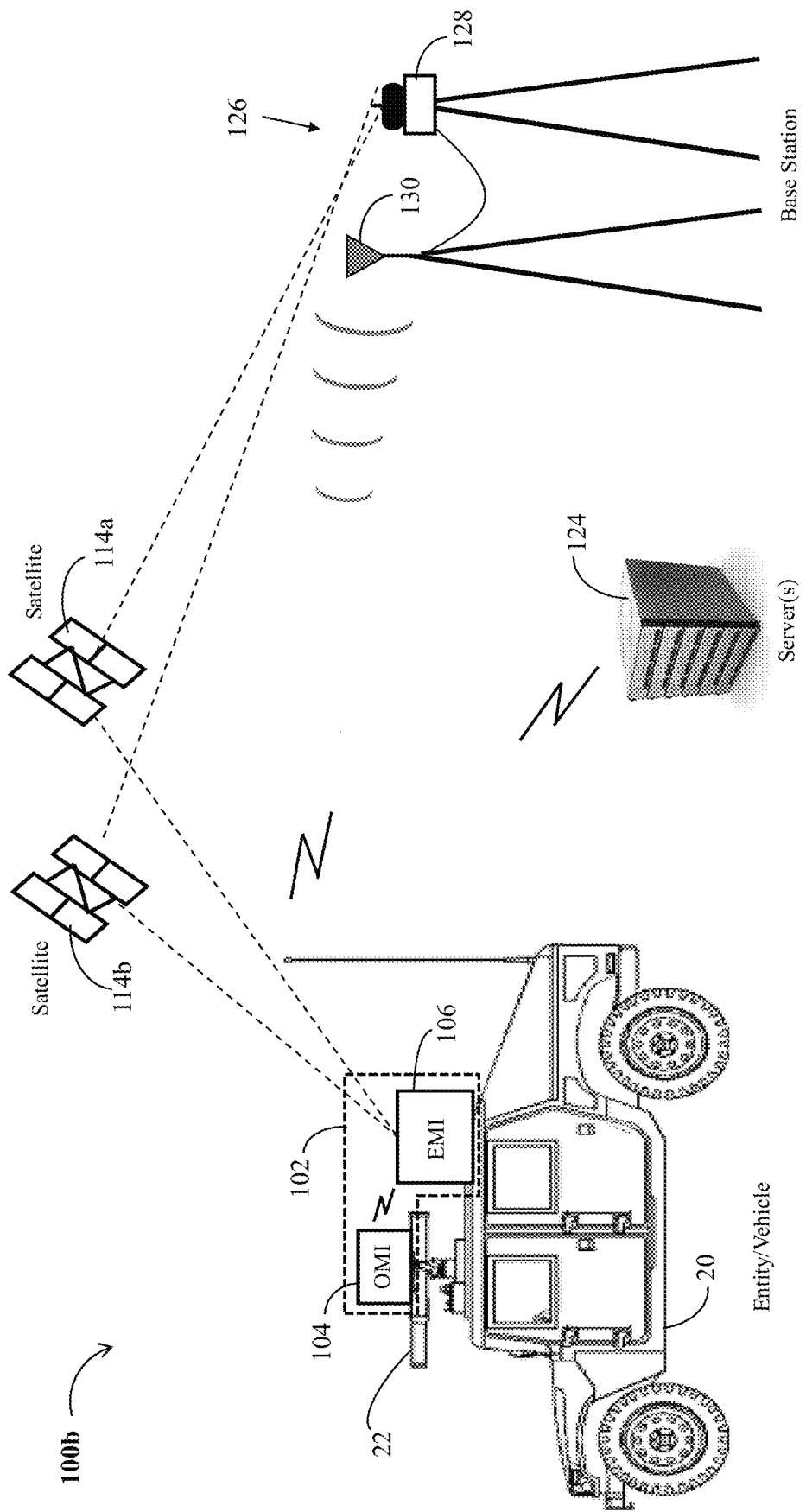
FIG. 1B shows a diagram illustrating a second environment employing instrumentation to track vehicles and objects in the second environment, according to example embodiments.

Referring to FIG. 1B, a diagram illustrating another example environment 100b employing instrumentation to track individuals and objects is shown, according to example embodiments. The environment 100b can be similar to environment 100a, except that the entity 20 is a vehicle, rather than an individual, carrying a corresponding object or weapon 22. An OMI (or weapon-mounted instrumentation or subsystem) 104 and an EMI (or vehicle-mounted instrumentation or subsystem) 106, similar to those discussed with respect to FIG. 1A, can be mounted on the vehicle 20. The weapon mounted subsystem or instrumentation 104 and the vehicle-mounted subsystem or instrumentation 106 can determine and track the positions and orientations of the vehicle 20 and the weapon 22 as discussed above with regard to the positions and orientations of the individual 10 and the helmet 14 of FIG. 1A.

While FIG. 1B shows the entity 20 to be a ground vehicle, in general the entity can be a tank, a ground vehicle, a drone, a helicopter, a fighter jet, a boat, a ship, an individual, or a combination thereof. For instance, the environment 100a or 100b can include a plurality of entities of different types, such as a combination of individuals (or soldiers), tanks, ground vehicles, drones, helicopters, boats and ships. Some of these entities can be real while others may be virtual.

Figure 3:
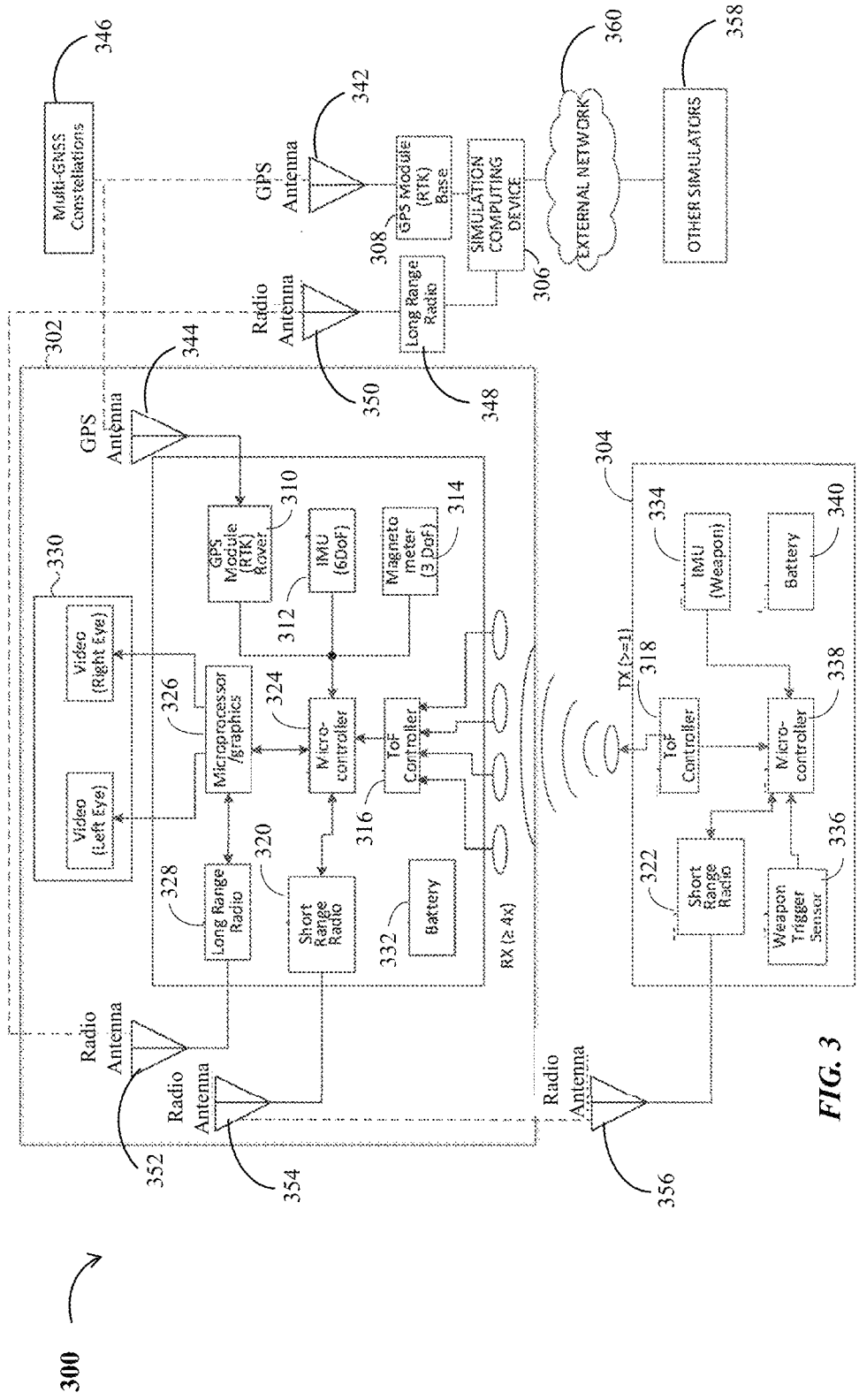
FIG. 3 shows a block diagram illustrating an example implementation of a system for tracking positions and orientations of an entity and an object carried by the entity, according to example embodiments.

Referring to FIG. 3 shows a block diagram illustrating an example implementation of a system 300 for tracking positions and orientations of an entity and an object carried by the entity, according to example embodiments. The system 300 can include an entity-mounted (e.g., helmet-mounted or vehicle-mounted) subsystem or instrumentation 302, an object-mounted (or weapon-mounted) subsystem or instrumentation 304, a simulation computing device 306, and a real-time kinematic (RTK) GPS base station 308. The system 300 can represent an example implementation of system 100 in FIGS. 1A and 1B, where the EMI 302 corresponds to the EMI 106, and the OMI 304 corresponds to the OMI 104. While system 100 is shown to include instrumentations mounted on entity 10 or 20 and corresponding weapon 12 or 22, the system 300 may also include the simulation computing device 306, representing an example implementation of the one or more servers 124, and the RTK GPS base station 308 representing an example implementation of the base station 126 of FIGS. 1A and 1B.

The entity-mounted subsystem 302 can include a GPS RTK rover module 310 that operates in conjunction with the RTK GPS base station 308 to identify a world-based location of the entity 10 or 20 or helmet 14 with a localization accuracy having an error margin of less than 1 cm from the actual location. The entity-mounted subsystem 302 can include an IMU array 312, such as a six-degree of freedom IMU array or a nine-degrees of freedom IMU array, that is configured to identify an orientation of the entity 10 or 20 or the helmet 14. The entity-mounted subsystem 302 may also include a magnetometer 314 that is configured to "deadrecon" the entity's (or helmet's) azimuth calculations from the IMU array 312 with respect to the real world. The entity-mounted subsystem 302 can include one or more time-of-flight (TOF) pulse controllers and receivers 316 (hereinafter "pulse controller 316") configured to receive pulses from a TOF pulse controller and transmitter 318 (hereinafter "pulse controller 316") of the OMI 304. In some embodiments, the TOF pulse controllers 316 may emit ultrasonic pulses or other types of pulses. It is to be noted that TOF technology or the TOF controllers 316 and 318 are not limited to ultrasonic TOF technology. The TOF controller 316 can include an array of sensors, such as the array of ultrasonic receiving sensors 118, and the TOF controller 318 can include ultrasonic transmitter 110 or other type of pulse transmitter. The TOF technology usually relies on time delays associated with signals or pulses received by different receiving sensors to determine a location of the transmitter.

The entity-mounted subsystem 302 can include a short-range radio transceiver 320, such as, by way of non-limiting example, a Bluetooth Low Energy radio transceiver, or other suitable wireless technology transceiver, configured to communicate with a short-range radio transceiver 322 of the object-mounted subsystem 304. The entity-mounted subsystem 302 can include a microcontroller 324 that is configured to communicate with, including the receipt of signals from, and in some circumstances control, the GPS RTK rover module 310, the IMU array 312, the magnetometer 314, the pulse controller(s) 316, and the short-range radio transceiver 320. The entity-mounted subsystem 302 can include a microprocessor/graphics module 326 (hereinafter, "microcomputer 326") that can communicate with, and receive information from, the microcontroller 324. The microcomputer 326 may include any suitable microprocessor and graphics module. For instance, the microcomputer 326 may include an Nvidia® Jetson™ TX2 microcomputer. The entity-mounted subsystem 302 can include a long-range radio transceiver 328 that is configured to communicate with the simulation computing device 306. The long-range radio transceiver 328 can be communicatively coupled to the microcomputer 326. The entity-mounted subsystem 302 can include an augmented reality (AR) headset 330, which may be worn by the trainee, or an AR display device 330.

As discussed above with regard to the one or more processors 122, the microcomputer 326 can use information received from the object-entity subsystem 304, the GPS RTK rover module 310, the IMU array 312, the magnetometer 314, the pulse controller(s) 316, the short-range radio transceiver 320, and the long-range radio transceiver 328 to determine locations and orientations of the corresponding entity 10 or 20 and weapon 12 (or object 12). The microcomputer 326 can also generate stereoscopic AR imagery and present such AR imagery to the AR headset (or AR display device) 330 to overlay certain real-world imagery seen by the trainee (or an operator of vehicle 20) and merge real-world scenery with computer-generated imagery. For example, the AR imagery may comprise other vehicles, such as tanks, planes, or the like, an impact point (splash) of a bullet fired from the weapon to which the object-mounted subsystem 304 is coupled, or the like. The entity-mounted subsystem 302 may also include a battery 332 that can provide power to the electronic components of the entity-mounted subsystem 302.

The object-mounted subsystem 304 can include an IMU array 334 configured to detect an orientation of the weapon or object 12 or 22, and a weapon trigger sensor 336 configured to detect the pulling of a trigger of the weapon 12 or 22 by a trainee. The object-mounted subsystem 304 may also include the short-range radio transceiver 322, which may include a Bluetooth Low Energy radio transceiver or other wireless transceiver. The object-mounted subsystem 304 can include a microcontroller 338 that is configured to communicate with, including the receipt of signals from, and in some circumstances control of, the pulse controller 318, the short-range radio transceiver 322, the IMU array 334 and the weapon trigger sensor 336. The microcontroller 338 can obtain orientation data from the IMU array 334 and indications (e.g., timestamps and/or flags) of weapon trigger events from the weapon trigger sensor 336. The short-range radio transceiver 322 can receive, from the microcontroller 338, the orientation data and the indications of weapon trigger events, and send the received information to the entity-mounted subsystem 302 or the respective microcontroller 324. The object-mounted subsystem 304 can include the TOF pulse controller 318 that emits pulses. The pulse controller(s) 316 can receive the pulses from the pulse controller 318 and provide information to the microcomputer 326 (via the microcontroller 324) that facilitates the determination of a location of the weapon 12 or 22 to which the pulse controller 318 is mounted with respect to entity 10 or 20 or helmet 14. The object-mounted subsystem 304 can include a battery 340 to power the various electronic components of the object-mounted subsystem 304.

The microcomputer 326 of the entity-mounted subsystem 302 can determine a precise (e.g., within 1 cm) location and orientation of the entity 12 or 22 or helmet 14 using data generated by the GPS RTK rover module 310, the IMU array 312, and the magnetometer 314. The microcomputer 326 can determine a precise, within 1 cm, location and orientation of the object or weapon 12 or 22 with respect to the entity 12 or 22 or helmet 14 based on information received from the IMU array 334 and the pulse controller 318, as discussed above with regard to FIGS. 1A and 2. The microcomputer 326 can include, by way of non-limiting example, digital terrain information that identifies an area of the earth on which the trainees(s) are training, information about the type of weapon 12 or 22 held by the trainee, and type of cartridge or ammunition used by such weapon 12 or 22. The microcomputer 326 can obtain information about weather conditions, such as, but not limited to, wind conditions, humidity, temperature, barometric pressure and the like. Such information may be obtained either from other sensors, or from an external source, such as the simulation computing device 306. Upon detection of a trigger pull identified by the weapon trigger sensor 336, the microcomputer 326 can determine a trajectory and strike location of ammunition fired by the weapon 12 or 22 using these factors, and generate AR imagery identifying, for example, a trace of the flight of the bullet and the strike location via a bullet splash. For example, if the bullet strikes water, the AR imagery may depict a splash in an actual pool of water seen by the trainee through the AR headset 330, or if the bullet strikes dirt, the AR imagery may depict dirt spraying outward at the impact location.

In some implementations, the RTK GPS base station 308 can include a GPS antenna 342, and the GPS receiver 310 can include a GPS antenna 344. The GPS antennae 342 and 344 can receive GPS signals from a multi-GNSS constellation 346. The simulation computing device 306 can include, or can be connected to, a long-range radio transceiver 348 having, or connected to, a long-range radio antenna 350. Similarly, the long-range radio transceiver 328 can include, or can be connected to, a long-range radio antenna 352. The long-range radio transceivers 328 and 348 can include 3G, 4G or 5G transceivers or radio transceivers of some other type, and can communicate with each other via a 3G, 4G or 5G network or some other type or wireless network. Also, the short-range radio transceivers 320 and 322 can include, or can be connected to, the short-range radio antennae 354 and 356, respectively.

In some implementations, the simulation computing device 306 can be communicatively coupled to one or more simulators via a communication network 360. The communication network 360 can include a local area network (LAN), a wide area network (WAN), a wired network, a wireless network, the Internet, other type of network or a combination thereof. The one or more simulators 358 can include computing devices, e.g., computer servers, to process data received from, or to be transmitted to, the simulation computing device 306.

Figure 4:
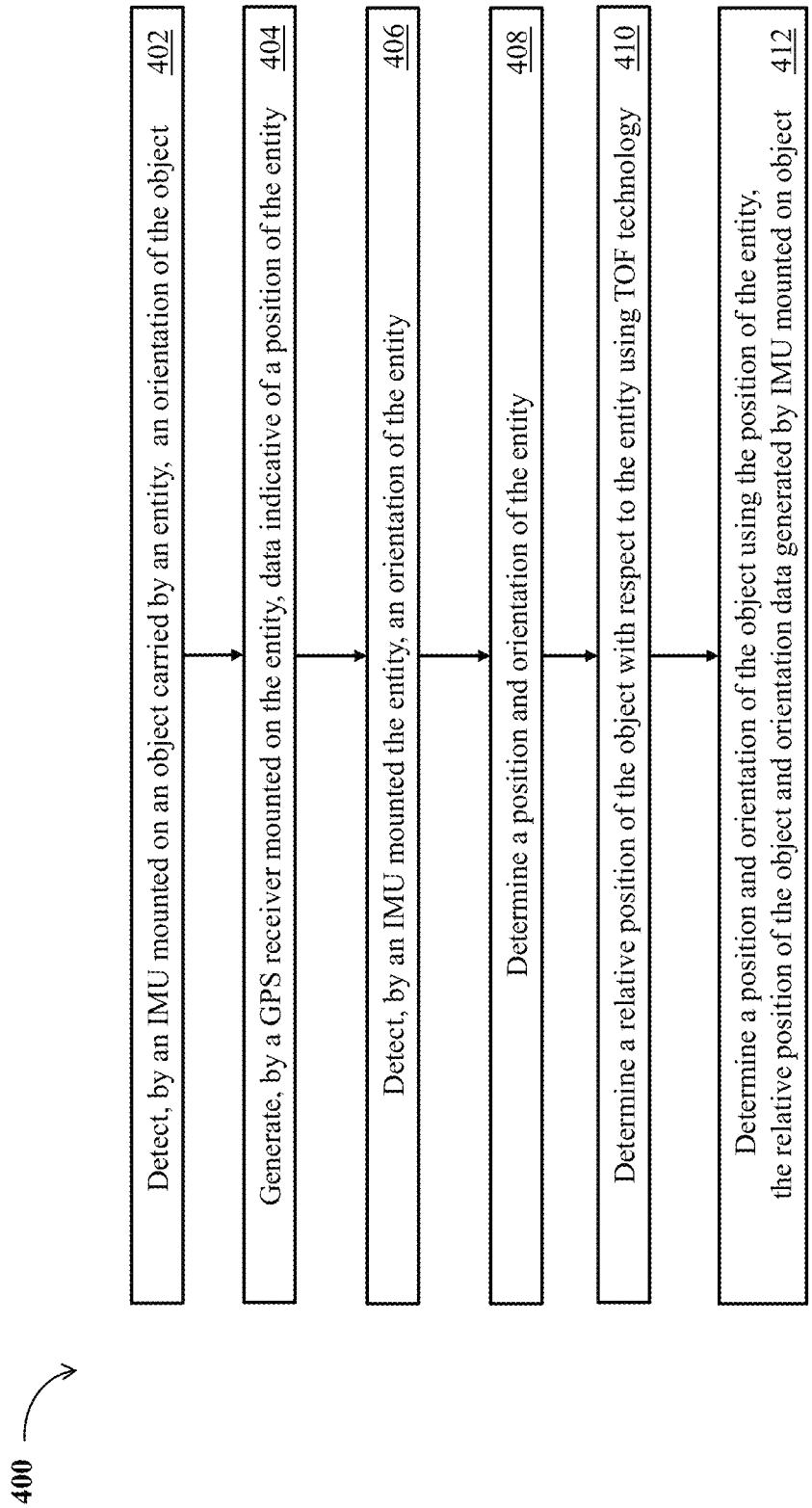
FIG. 4 is a flow diagram illustrating a method of tracking entities and objects in an environment, according to example embodiments.

Referring to FIG. 4, a flowchart illustrating a method 400 for track entities and objects in an environment, according to example embodiments. In brief overview, the method 400 can include an IMU array, mounted on an object carried by an entity, detecting an orientation of the object (STEP 402). The method 400 can include a GPS receiver, mounted on the entity, generating data indicative of a position of the entity (STEP 404). The method 400 can include an IMU array mounted the entity detecting an orientation of the entity (STEP 406). The method 400 can include determining a position and orientation of the entity (STEP 408). The method 400 can include determining a relative position of the object with respect to the entity using TOF technology (STEP 410), and determining a position and orientation of the object using the position of the entity, the relative position of the object and orientation data generated by the IMU array mounted on the object (STEP 412).

The method 400 can include an IMU array, mounted on an object 12 or 20 carried by an entity, detecting an orientation of the object (STEP 402). As discussed above with regard to FIGS. 1A, 1B and 3, the IMU array 108 or 334 one or more accelerometers to detect linear acceleration, and one or more gyroscopes to detect rotational rate. The IMU 108 or 334 can be a six-degree of freedom IMU array having a pair of an accelerometer and a gyroscope per axis for each of the three principal axes referred to as pitch, roll and yaw. In some implementations, the IMU array 108 or 34 can be a nine-degree of freedom IMU array, and can include for each axis of the three principal axes a corresponding accelerometer, a corresponding gyroscope and a corresponding magnetometer. The IMU array 108 or 334 can determine an orientation of the object 12 or 20 using the detected linear acceleration and detected rotational rate.

The method 400 can include a GPS receiver, mounted on the entity, generating data indicative of a position of the entity (STEP 404). The GPS receiver can be an RTK GPS receiver 112 or an RTK GPS rover 310, as discussed with respect to FIGS. 1A, 1B and 3. The GPS receiver 112 or 310 can receive GPS signals from a plurality of one or more satellites 114 and one or more GPS base stations 126, and use the GPS signals to determine world-based location or position of the entity 10 or 20 or the helmet 14. The GPS receiver 112 can determine the position of location of the entity 10 or 20 or the2 helmet 14 periodically, e.g., 8 to 10 times per second. The determined location or position can be defined in terms of longitude and latitude coordinates. In some implementations, the location or position can be further defined in terms of an altitude coordinate.

The method 400 can include an IMU array mounted on the entity detecting an orientation of the entity (STEP 406). As discussed above with regard to FIGS. 1A, 1B and 3, IMU array 116 or 312 can be integrated into an EMI 106 or 302 to detect and orientation of the entity 10 or 20 or the helmet 14. The IMU array 116 or 312 can be a six-degree of freedom IMU array having a pair of an accelerometer and a gyroscope per axis for each of the three principal axes referred to as pitch, roll and yaw. In some implementations, the IMU array 116 or 312 can be a nine-degree of freedom IMU array having for each axis of the three principal axes a corresponding accelerometer, a corresponding gyroscope and a corresponding magnetometer. The IMU array 116 or 312 can provide measurements of the orientation of the entity 10 or 20 or the helmet 14 periodically over time.

The method 400 can include determining a position and orientation of the entity (STEP 408). The one or more processors 122 or microcomputer 326 can combine positioning data generated by the GPS receiver 112 or 310 and orientation generated by the IMU array 116 or 312 to determine a location and orientation of the entity 10 or 20 or the helmet 14. The one or more processors 122 or microcomputer 326 can make such determination periodically, e.g., every 0.1 second. In some implementations, the one or more processors 122 or microcomputer 326 can determine the location and orientation of the entity 10 or 20 or the helmet 14 at a higher frequency (e.g., more than times per second), for example, by interpolating GPS data and/or IMU data.

The method 400 can include determining a relative position of the object with respect to the entity using TOF technology (STEP 410). The OMI 104 or 304 can include a TOF pulse transmitter, such as the ultrasonic transmitter 110 or the pulse controller 318, to transmit pulses periodically, and the EMI 106 or 306 can include an array (or a plurality) of TOF pulse receivers, such as the array of ultrasonic receiving sensors 118 or the pulse controller 316. The clocks of the TOF pulse transmitter and the clock of the TOF pulse receivers can be time synchronized, e.g., within few seconds. Using time delays between the transmitted pulse and corresponding versions received by the TOF pulse receivers, the one or more processors 122 or microcomputer 326 can determine a location of the object 12 or 22 relative to the entity 10 or 20 or the helmet 14. For instance, the one or more processors 122 or microcomputer 326 can employ the Monte Carlo iterative approach described above or some other triangulation technique to determine the relative location of the object 12 or 22.

The method 400 can include determining a position and orientation of the object using the position of the entity, the relative position of the object and orientation data generated by the IMU array mounted on the object (STEP 412). The one or more processors 122 or microcomputer 326 can combine the relative location of the object 12 or 22 and the location of the entity 10 or 20 (or helmet 14), determined based on GPS data, to determine a location of the object 12 or 22 in terms of earth coordinates, or with respect to a fixed coordinate system of the environment 100a or 100b. The one or more processors 122 or microcomputer 326 can determine the orientation of the object 12 or 22 based on orientation data generated by IMU array 108 or 334.

The method 400, or any step thereof, can be performed according to various embodiments or implementations discussed above with regard to FIGS. 1A through 3. The method 400 or a combination of steps thereof (e.g., steps performed by one or more processors 122 or microcomputer 326) can be implemented as computer code instructions that are stored on a computer-readable medium, and executed by one or more processors.

Figure 5:
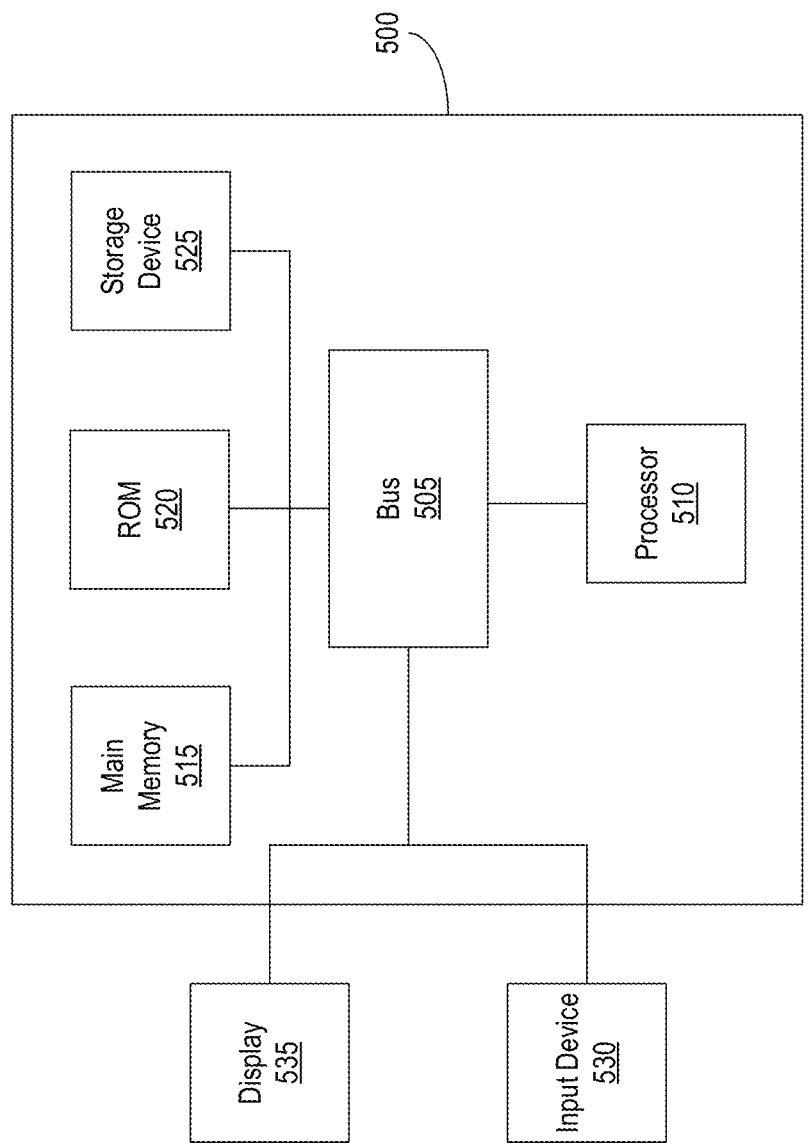
FIG. 5 illustrates a block diagram of an example computer system useful in implementing one or more components detailed herein.

Referring now to FIG. 5, depicted is a block diagram of an example computer system 500. The computer system or computing device 500 can include or be used to implement the system 102 or 300, or its components such as EMI 106 or 302, OMI 104 or 304, the server(s) 124, the simulation computing device 306 or the simulators 358, among others. The computing system 500 can include at least one bus 505 or other communication component for communicating information and at least one processor 510 or processing circuit coupled to the bus 505 for processing information. The computing system 500 can also include one or more processors 510 or processing circuits coupled to the bus 505 for processing information. The computing system 500 can also include at least one main memory 515, such as a random access memory (RAM) or other dynamic storage device, coupled to the bus 505 for storing information, and instructions to be executed by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as an administrator of the data processing system. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the AR glasses 132, the AR headset 330, or other component of FIGS. 1A, 1B and 3.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system to track entities and objects in an environment, comprising:
   a first inertial measurement unit (IMU) array mounted on an object carried by an entity to detect an orientation of the object;
   an ultrasonic transmitter mounted on the object to transmit an ultrasonic signal;
   a real-time kinematics (RTK) global positioning system (GPS) receiver mounted on the entity;
   a second IMU array mounted on the entity to detect an orientation of the entity in the environment;
   an array of ultrasonic receivers mounted on the entity to receive a plurality of versions of the ultrasonic signal transmitted by the ultrasonic transmitter, the array of ultrasonic receivers synchronized with the ultrasonic transmitter; and
   one or more processors to:
      determine a position and orientation of the entity in the environment using positioning data received from the RTK GPS receiver and first orientation data generated by the second IMU array;
      determine a relative position of the object with respect to the entity using the plurality of versions of the ultrasonic signal received by the array of ultrasonic receivers; and
      determine a position and orientation of the object in the environment using the position of the entity, the relative position of the object with respect to the entity and second orientation data generated by the first IMU array.

2. The system of claim 1, comprising:
   a first microcontroller mounted on the object to transmit the second orientation data generated by the first IMU array; and
   a second microcontroller mounted on the entity to receive the second orientation data from the first microcontroller,
   wherein the one or more processors are further configured to receive the second orientation data from the second microcontroller.

3. The system of claim 1, comprising:
   a stationary base station arranged in the environment and including:
      a GPS receiver; and
      a transmitter to broadcast a differential location error correction factor representing a difference between an actual location of the stationary base station and positioning data of the stationary base station generated by the GPS receiver,
      wherein the one or more processors are further configured to determine the position of the entity further using the differential location error correction factor.

4. The system of claim 1, wherein the object is a firing weapon and the one or more processors are mounted on the entity and configured to:
   receive, from a remote server, positioning and orientation data of one or more other entities; and
   determine trajectory and landing position of munition fired by the firing weapon relative to the one or more other entities.

5. The system of claim 1, wherein the entity includes a ground vehicle, a drone or a human.

6. The system of claim 1, wherein the entity is a human, and the second IMU array and the array of ultrasonic receivers are mounted on a helmet of the human.

7. The system of claim 1, wherein the entity is a human, and the system further comprises augmented reality (AR) glasses communicatively coupled to the one or more processors.

8. The system of claim 1, wherein the object is a firing weapon and the system further comprising one or more remote servers communicatively coupled to the one or more processors, the one or more remote servers configured to:
   receive position and orientation data of the entity and the firing weapon from the one or more processors;
   receive position and orientation data of other entities in the environment and position and orientation data of corresponding firing weapons associated with the other entities; and
   determine a trajectory and landing position of munition fired by the firing weapon relative to the other entities in the environment.

9. The system of claim 8, wherein the one or more remote servers are further configured to:
   record position and orientation data of the entity and position and orientation data of the firing weapon over a time duration;
   record position and orientation data of the other entities in the environment and position and orientation data of the corresponding firing weapons over the time duration; and
   record events, including trajectories and landing positions of munition fired, within the time duration.

10. The system of claim 9, wherein the one or more remote servers are further configured to:
    reconstruct a scene of the environment corresponding to one or more timestamps within the time duration.

11. The system of claim 10, wherein the one or more remote servers are further configured to reconstruct the scene from a viewpoint of the entity.

12. The system of claim 1, wherein the environment is a physical training environment, a virtual training environment, a constructive training environment or a combination of physical, constructive and virtual environments.

13. A method to track entities and objects in an environment, comprising:
    detecting, by a first inertial measurement unit (IMU) array mounted on an object carried by an entity, an orientation of the object;
    transmitting, by an ultrasonic transmitter mounted on the object, an ultrasonic signal;
    generating, by a real-time kinematics (RTK) global positioning system (GPS) receiver mounted on the entity, positioning data indicative of a position of the entity;
    detecting, by a second IMU array mounted on the entity, an orientation of the entity in the environment;
    receiving, by an array of ultrasonic receivers mounted on the entity, a plurality of versions of the ultrasonic signal transmitted by the ultrasonic transmitter, the array of ultrasonic receivers synchronized with the ultrasonic transmitter;

determining a position and orientation of the entity in the environment using the positioning data generated by the RTK GPS receiver and first orientation data generated by the second IMU array;

determining a relative position of the object with respect to the entity using the plurality of versions of the ultrasonic signal received by the array of ultrasonic receivers; and determining a position and orientation of the object in the environment using the position of the entity, of the relative position of the object with respect to the entity and second orientation data generated by the first IMU array.

14. The method of claim 13, comprising:

transmitting, by a first microcontroller mounted on the object to a second microcontroller mounted on the entity, the second orientation data generated by the first IMU array.

15. The method of claim 13, comprising:

broadcasting, by a stationary base station arranged in the environment, a differential location error correction factor representing a difference between an actual location of the stationary base station and positioning data of the stationary base station generated by a GPS receiver of the stationary base station, wherein determining the position of the entity includes using the differential location error correction factor.

16. The method of claim 13, wherein the object is a firing weapon and the method comprises:

receiving, from a remote server, positioning and orientation data of one or more other entities; and determining, by the remote server, a trajectory and landing position of munition fired by the firing weapon relative to the one or more other entities.

17. The method of claim 13, wherein the entity includes a ground vehicle, a drone or a human.

18. The method of claim 13, wherein the entity is a human, and the second IMU array and the array of ultrasonic receivers are mounted on a helmet of the human.

19. The method of claim 13, wherein the object is a firing weapon and the method further comprises:

receiving, by one or more remote servers, position and orientation data of the entity and position and orientation data of the firing weapon;

receiving, by the one or more remote servers, position and orientation data of other entities in the environment and position and orientation data of corresponding firing weapons; and determining, by the one or more remote servers, a trajectory and landing position of munition fired by the firing weapon relative to the other entities in the environment.

20. The method of claim 19, comprising:

recording, by the one or more remote servers, position and orientation data of the entity and position and orientation data of the firing weapon over a time duration;

recording, by the one or more remote servers, position and orientation data of the other entities in the environment and position and orientation data of the corresponding firing weapons over the time duration;

recording, by the one or more remote servers, events including trajectories and landing positions of munition fired during the time duration; and reconstructing, by the one or more remote servers, a scene of the environment corresponding to a time instance or time interval of the time duration.

* * * * *